US012232015B2

(12) United States Patent
Kasi et al.

(10) Patent No.: US 12,232,015 B2
(45) Date of Patent: Feb. 18, 2025

(54) REPOSITORY FUNCTION ADDRESS BLOCKING

(71) Applicant: T-Mobile USA, Inc., Bellevue, WA (US)

(72) Inventors: Narayanan Govindan Kasi, Olathe, KS (US); Saravana Velusamy, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 391 days.

(21) Appl. No.: 17/813,979

(22) Filed: Jul. 21, 2022

(65) Prior Publication Data

US 2024/0031910 A1    Jan. 25, 2024

(51) Int. Cl.
*H04W 48/02* (2009.01)
*H04W 76/12* (2018.01)
*H04W 80/10* (2009.01)

(52) U.S. Cl.
CPC ........... *H04W 48/02* (2013.01); *H04W 76/12* (2018.02); *H04W 80/10* (2013.01)

(58) Field of Classification Search
CPC ..... H04W 48/02; H04W 76/12; H04W 80/10; H04W 24/04; H04W 8/26; H04L 61/5007
See application file for complete search history.

(56) References Cited

U.S. PATENT DOCUMENTS

2019/0158985 A1* 5/2019 Dao ...................... H04W 28/04
2020/0366642 A1* 11/2020 Zong ................... H04L 61/5007

* cited by examiner

*Primary Examiner* — Steven Hieu D Nguyen
(74) *Attorney, Agent, or Firm* — Lee & Hayes, P.C.

(57) ABSTRACT

System and methods for repository function address blocking are described herein. A repository function in a wireless communications network may provide function addresses to requesting functions and may receive requests from such functions to block addresses that are unreachable by the requesting function. The repository function may store data indicating the blocked addresses and corresponding requesting function and filter those addresses from responses generated for address requests received from the corresponding requesting function. Function may also request addresses be unblocked after determining that connectivity to such addresses has been restored.

20 Claims, 9 Drawing Sheets

REPOSITORY FUNCTION ADDRESS BLOCKING

BACKGROUND

The number of wireless communications devices (e.g., user devices such as mobile telephones, smartphones, tablets, laptops, etc.) in use has rapidly grown in recent years. The networks that provide services to such devices have grown to accommodate them. As devices move to different geographical areas, they typically have to establish new communications sessions with different portions of the network. There may be many different network devices and functions involved in registering wireless devices with a network and establishing resources for that device. With many such devices and functions relying on other devices and functions for information that is used to register and provide resources for user wireless devices, it may be challenging to maintain up-to-date and correct information across all such devices and functions in a wireless network.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
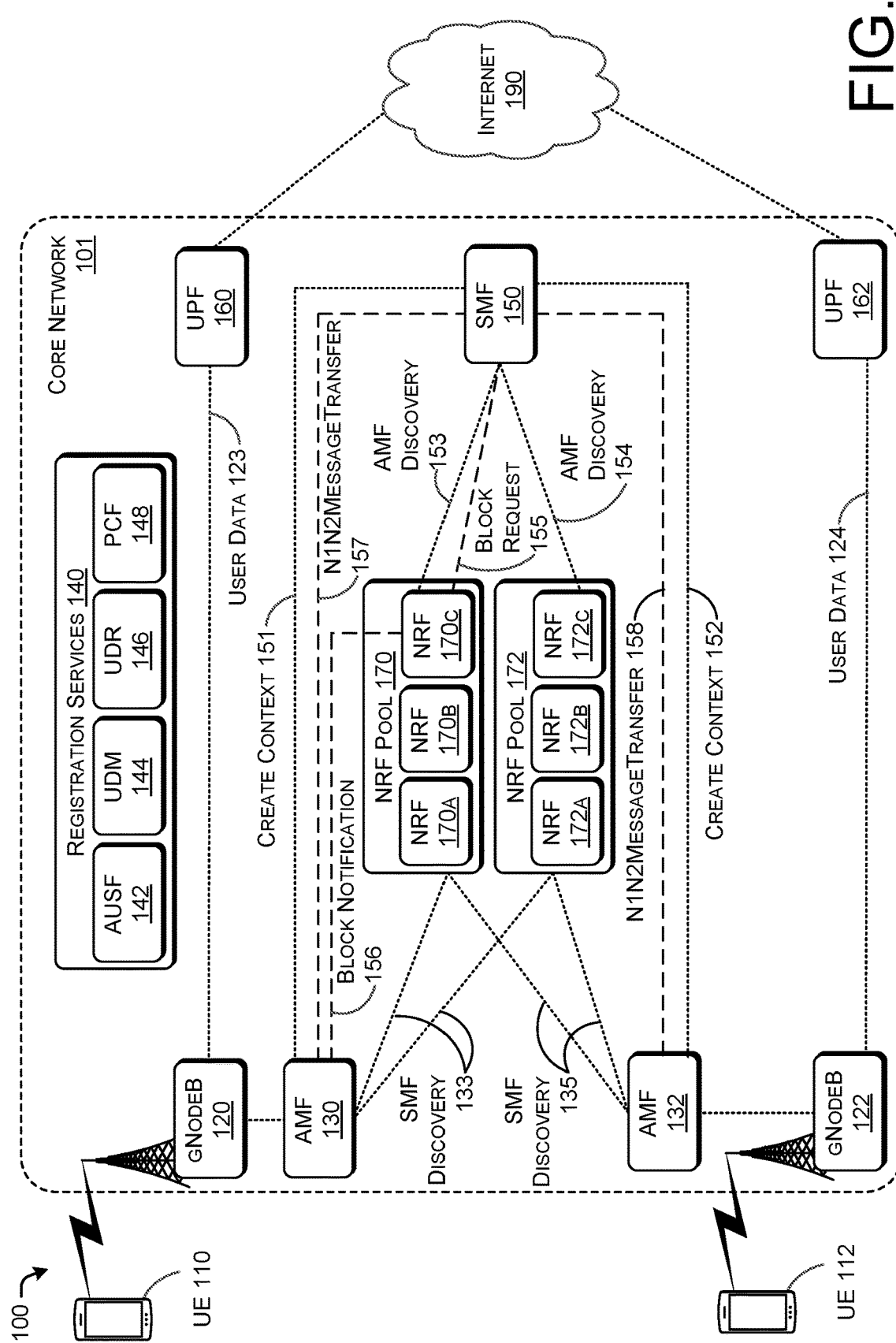
FIG. 1 is a schematic diagram of an illustrative wireless communications network environment in which systems and methods for repository function address blocking may be implemented, in accordance with examples of the disclosure.

This disclosure is directed in part to systems and techniques for performing for repository function address blocking in wireless communications networks and other networks that perform wireless device registration and resource provisioning. Such networks include any networks that may facilitate wireless communications services for one or more wireless communications devices. Such networks include networks that support one or more 3GPP standards, including, but not limited to, Long Term Evolution (LTE) networks (e.g., 4G LTE networks) and New Radio (NR) networks (e.g., 5G NR networks). However, the disclosed systems and techniques may be applicable in any network or system in which a user device may request and receive access to communicate with one or more network and/or remote devices using any protocol.

In conventional systems, a wireless user device (e.g., mobile telephone, smartphone, user equipment (UE), etc.) may wirelessly communicate with a base station (e.g., gNodeB, eNodeB, NodeB, base transceiver station (BTS), etc.) to request wireless communications services, such as a packet data communication session between the user device and a data network (e.g., the Internet, an IP multimedia system or subsystem (IMS), etc.). Various operations may be performed by network components, devices, and/or functions to obtain or otherwise establish the requested services for the wireless user device. Such operations may include authenticating the wireless user device and/or a user of the device, authorizing the requested services for the device and/or user, registering the device at the various systems and functions needed to provide the requested services, etc.

For example, a UE may transmit a request for a protocol data unit (PDU) session with a data network to a gNodeB. A PDU session, for example in a 5G network, may be an end-to-end communications session between a device (e.g., the UE) and a data network (e.g., the Internet). The gNodeB may relay or otherwise convey this PDU session request to an access management function (AMF) in the core of the wireless network in which the gNodeB is configured. The AMF may interact with one or more other components to perform the operations needed to establish this session, such as authenticating the device and/or user, registering the UE with the network, etc. In a particular example, the AMF may interact with a session management function (SMF) to establish the session. The SMF may perform various session establishment operations, such as determining and assigning particular functions and/or components to service the session, associating policies for the session, etc. In examples, an important function performed by an SMF may be providing the access information needed by the UE to communicate with a data network using the established session. The SMF provides this information to the AMF for relay to the gNodeB and ultimately to the UE requesting the PDU session. In 5G examples, a message that provides such information may be referred to as a "N1N2MessageTransfer." These and other messages communicating similar information may be referred to generally herein as a "message transfer" messages.

Components and functions within a network, such as AMFs and SMFs, may vary and may change often due to operational circumstances (e.g., maintenance, load, failures, etc.). Therefore, in various examples, a network may include a repository component or function that is configured to store and provide current addresses and/or other connectivity information for the functions and/or components in the network. In response to receiving a request from a particular function in a network, a repository function may provide a current address (e.g., IP address) for another function to the requesting function. The requesting function may then use that address to communicate with the associated function to perform one or more operations. In 5G examples, such a repository function may be referred to as a network function (NF) repository function (NRF). These and other functions performing similar operations may be referred to generally herein as a "repository functions." In various embodiments, for example, for load-sharing and/or redundancy purposes, multiple NRFs may be configured in "pools" of NRFs that may be queried by various components and/or functions in (e.g., particular portions of) a core of a wireless network.

In various examples, a particular function may have multiple addresses (e.g., IP addresses) that it may use to communicate with one or more other functions and/or components configured in a network. By using multiple address and/or communications interfaces, a single function or component in a network may interact with multiple other functions and/or components (e.g., substantially simultaneously) and thereby perform various operations more quickly and efficiently. By having multiple address and/or communications interfaces, a single function or component in a network may also have redundant means of communicating with other functions and/or components. For example, if one particular address or interface is no longer reachable for some reason, the function using that address or interface may communicate with other functions and/or components using one of its other addresses or interfaces. In some examples, one or more particular addresses or interfaces configured at a function may be dedicated to one or more particular services or operations, while in other examples, one or more addresses or interfaces configured at a function may be generally available for some or all of the services and/or operations performed at that function. In particular examples, an AMF may be configured with multiple addresses that may be used to communicate with the AMF for various operations, such as PDU session establishment operations.

The repository functions in a network, (e.g., the one or more NRFs in an NRF pool) may be configured to store and maintain the multiple addresses that may be configured for individual network functions and/or components. For example, each NRF in a particular NRF pool may be configured to store the multiple IP addresses that may be configured for a particular AMF. When a request for an IP address for the AMF is received by an NRF in the NRF pool, the NRF may determine one of the addresses to provide in response. For example, the NRF may randomly select an address associated with the AMF to provide in response. Alternatively, the NRF may provide the IP addresses in a round-robin manner, for example, in an effort to load balance traffic for the AMF across the available addresses. Other techniques may also, or instead, be used by a repository function to select an address from those available for a particular component or function. In some examples, a repository function may choose from addresses dedicated to a service or operation associated with the request for the address, while in other examples the repository function may select addresses without taking into account a service or operation.

Ideally, individual repository functions (e.g., each NRF in an NRF pool, and in some examples, each NRF across multiple NRF pools where such a configuration is in place), should have the same corresponding addresses stored for the functions and/or components for which it serves as an address repository. However, the address information stored at one or more repository functions may become out of synchronization with that stored on other repository functions and/or may be out of date for various reasons (e.g., missed updates, configuration error, communications issues, etc.). In such situations, the out-of-sync repository function may reply to requests for address with out-of-date and/or incorrect address information. In other cases, a particular address, even though current and in use by a particular component or function, may not be reachable or otherwise usable by another component. For example, there may be a routing issue or misconfiguration in the core wireless network that prevents a first component from successfully communicating with a particular address of a second component. If the first component queries a repository function for an address for the second component and receives the unreachable address in response, the first component will fail to successfully communicate with the second component, regardless if why the address is unreachable.

To address this issue of receiving unreachable addresses from a repository function and to mitigate the inefficiency introduced into a network by providing unreachable addresses to various functions and/or components, the disclosed systems and methods allow for the creation and use of a "block list" on a repository function. This block list may include one or more entries that indicate an address-requesting component and a corresponding blocked component and/or address. In various examples, a repository function may use this block list in determining the address to include in a response to a component or function that has requested an address for another component or function. After determining an address in response to an address request, the repository function may determine if the address is associated with the requesting component or function in the block list. If so, the repository function may determine another address instead (also checking that address against the block list) and reply with an address that is not blocked for the requesting component or function in the block list.

In various examples, a repository function may determine the information for use in such a block list from communications received from functions and/or components. For example, a particular component may receive a first address for a destination component from a repository function. The address-requesting component may then determine that it is unable to communicate with the destination component using the first address. The address-requesting component may transmit an instruction to the repository function requesting that the repository function include an entry in a block list that will prevent the first address from being provided to the address-requesting component in response to a request for an address for the destination component. In some examples, the repository function may also transmit a notification to the destination component that the address-requesting component is unable to communicate with the destination component using the first address. The destination component may use this information to avoid attempting to communicate with the address-requesting component using the first address.

The address-requesting component may attempt to communicate with the first address in the future (e.g., based on a timer expiry) and, if it is successful, it may transmit another instruction to the repository function to remove the entry in a block list. Alternatively or additionally, the address-requesting component may determine based on other factors to request that the repository function remove the entry from the block list. A repository function may notify a corresponding destination component when it removes an entry from a block list. The destination component may use this information to resume communicating with the address-requesting component using the previously blocked address.

By facilitating the use of such block lists and entries at a repository function, the systems and methods described herein provide more efficient and accurate determinations of addresses by repository functions and reduced resource utilization. By minimizing the distribution and attempted usage of unreachable function and component addresses, the systems and methods described herein can improve the performance and increase the efficiency of both network and user resources. For example, the methods and systems described herein may be more efficient and/or more robust than conventional techniques, as they may increase the use of valid addresses and reduce the wasting of resources on attempts to communicate using invalid or otherwise unreachable addresses. That is, the methods and systems described herein provide a technological improvement over existing address determination systems and processes by facilitating improved address determination accuracy and increasing network efficiency by reducing the traffic associated with failed attempts to communicate using unreachable addresses and repeated requests for addresses when unreachable addresses are used initially. In addition to improving the efficiency of network and device resource utilization, the systems and methods described herein can provide more robust systems by, for example, making more efficient use of network devices by reducing unnecessary and/or unproductive device and network signaling and processing associated with unreachable addresses and devices, thereby freeing network and device resources for more productive operations.

Illustrative environments, signal flows, and techniques for implementing systems and methods for repository function address blocking are described below. However, the described systems and techniques may be implemented in other environments.

Illustrative System Architecture

FIG. 1 is a schematic diagram of an illustrative wireless network environment 100 in which the disclosed systems and techniques may be implemented. The environment 100 may include a UE 110 that may wirelessly communicate with an gNodeB 120 and a UE 112 that may wirelessly communicate with a gNodeB 122. While referred to as an "gNodeBs" for explanatory purpose herein, the gNodeBs 120 and 122 may be any type of base station, including, but not limited to, any type of BTS, NodeB, eNodeB, gNodeB, etc. The gNodeBs 120 and 122 may communicate with other components and functions in a core network 101. The core network 101 may be any one or more networks that facilitate communications between particular devices, components, and/or functions of various types in the core of a wireless communications network that may facilitate communication between computing device and/or mobile devices (e.g. UEs). Various connections between components and functions in the core network 101 may be wired, wireless, or a combination thereof. The components and functions described herein may be implemented as physical devices, as software components executing on one or more computing devices, any combination thereof. In various embodiments, the core network 101 may facilitate the establishment of communications sessions for one or more wireless devices, such as UEs 110 and 112. In examples, the core MAS network 101 may facilitate authorized packet-based communications between such wireless devices and other wireless devices, devices on the Internet, one or more IP multimedia subsystems (IMSs), and/or one or more other data networks (DNs).

In FIG. 1, connections between components may be logical connections indicated by dashed lines. These logical connections may also be facilitated by one or more wired and/or wireless connections and may include traversal of one or more devices, components, and/or functions (not shown in FIG. 1).

In environment 100, the UE 110 may communicate with the gNodeB 120 to request the establishment of a PDU session (e.g., to communicate with one or more systems at the Internet 190). The gNodeB 120 may relay the request or otherwise transmit a request for the establishment of the PDU session to an AMF 130. In various examples, an AMF may interact with an SMF to allocate the resources required to establish PDU sessions for UEs. Such interactions may include authenticating and authorizing a user and/or user device (e.g., UE), creating contexts for such sessions, determining and applying session policies, establishing user plane resources, etc. Therefore, the AMF 130, based on receiving this request for the establishment of a PDU session on behalf of the UE 110, may query one or more of the NRF pools 170 and 172 for an address (e.g., IP address) for an SMF with which it may interact to establish the requested PDU session.

In examples, the AMF 130 may exchange SMF discovery communications 133 with one or more of NRFs 170*a-c* of NRF pool 170 or NRFs 172*a-c* of NRF pool 172. As described herein, a wireless communications network may be configured with one or more NRF pools, each of which may include one or more NRFs. In this discovery communication 133, the AMF 130 may provide an identifier of one or more particular SMFs with which it may wish to interact or it may request an SMF address generally. The AMF 130 may or may not specify in the communication 133 a particular service for which the AMF 130 is requesting an address.

In some examples, NRF pools such as pools 170 and 172 may be geographically located and configured to provide repository function services to functions and components that are relatively geographically proximate to the pool. In such examples, there may be one or more pools provided for a particular geographical area or region. The NRFs within each pool may be configured to have synchronized address information for the various devices represented in each NRF. However, as described herein, such information may become out of sync and/or may not be valid information for component users of such NRF.

In this example, the AMF 130 may receive an address for an SMF 150 from one of NRFs 170*a-c* of NRF pool 170 or NRFs 172*a-c* of NRF pool 172. The AMF 130 may then initiate PDU session establishment communications, such as create context communications 151, with SMF 150. Note that the AMF 130 may be configured with multiple addresses and may use a first of such addresses in this example for the communications 151. The SMF 150 may perform various PDU session establishment operations, in some examples interacting with one or more other components and/or functions. For example, the SMF 150 may interact with one or more of the registration services 140, which may include any one more of an authentication server function (AUSF) 142, a unified data management (UDM)

144, a unified data repository (UDR) 146, and a policy control function (PCF) 148 (operations not shown in FIG. 1). In various examples, the SMF 150 may also communicate with the AMF 130 via communications 151, for example, to acknowledge receipt of a context creation request, to indicate that the requested context for the PDU session has been successfully created, to indicate that creation of the requested context has failed, etc. In the communications 151, the SMF 150 may use the first address associated with the AMF 130 that the AMF used to initiate the communications 151.

Beyond context creation, the SMF may perform one or more other operations to complete establishing the PDU session for the UE 110. For example, the SMF 150 may determine or otherwise perform operations to generate information that the UE 110 and/or the gNodeB 120 may use to facilitate packet communications with other devices using the PDU session. Such information may include tunnel information, quality of service (QoS) information, session identifier(s), security information, and/or any other information needed by a UE and/or a gNodeB to successfully use a PDU session for packet communications with one or more other devices and/or DNs. This information may be referred to here generally as message transfer data, or in specific 5G examples, as N1N2MessageTransfer data.

To convey message transfer data to the AMF 130, the SMF 150 may use a separate and distinct communications sessions than communications 151, which may be dedicated to context creation communications. For example, the SMF 150 may establish N1N2MessageTransfer communications 157 for providing message transfer data to the AMF 130. In order to determine an address for the AMF 130 to use with communications 157, the SMF 150 may query one of NRFs 170a-c of NRF pool 170 or NRFs 172a-c of NRF pool 172. The SMF 150 may exchange AMF discovery communications 153 with one or more of these NRFs. In this discovery communication 153, the SMF 150 may provide an identifier of the AMF 130 (e.g., received during communication 151 and/or as configured at the SMF 150). The SMF 150 may or may not specify in the communication 153 a particular service for which the SMF 150 is requesting an address.

The queried NRF may respond via the discovery communications 153 with an address for the AMF 130. In some examples, this may be the first address that was used in communication 151. In other examples, this may be another address for the AMF 130 with which the SMF 150 is able to successfully communicate. In such examples, the SMF 150 may the use the provided address for the AMF 130 to establish the N1N2MessageTransfer communications 157 and provide message transfer data for the requested PDU session to the AMF 130. The AMF 130 may then provide this information to the gNodeB 120 (that may provide some or all of such information to the UE 110). Using this information, the UE 110 may, via the gNodeB 120, exchange user data 123 with the devices and/or DNs (e.g., the Internet 190) via a user plane function (UPF) 160.

However, in other examples, a second address for the AMF 130 provided to the SMF 150 by the queried NRF may be different than the first address for the AMF 140 (used for the create context communications 151) and may not be an address reachable by the SMF 150. For example, the particular NRF queried may have out of date information and/or may be out of sync with other NRFs and may therefore be providing one or more expired or otherwise invalid addresses for the AMF 130. Alternatively or additionally, the queried NRF may have provided a valid and current address for the AMF 130, but for other reasons that address may not be reachable by the SMF 150 (e.g., due to a routing or configuration issue). In some examples, the queried NRF may have provided an empty, incomplete, improperly formatted, or otherwise invalid address for the AMF 130 (e.g., due to a configuration issue at the NRF). Regardless of the reason, because the address provided by the NRF is not reachable by the SMF 150, the SMF 150 may be unable to provide the message transfer data to the AMF 130, thereby preventing the completion and use of the PDU session requested by the UE 110.

The SMF 150 may determine that the second address for the AMF 130 provided by the queried NRF is unreachable, for example due to failing to receive a response from the AMF 150, receiving an indication of communications failure, etc. In response, the SMF 150 may transmit a block request via block request communications 155 to the NRF that provided the second address. For example, the SMF 150 may have queried NRF 170c for an address for the AMF 130 and may have received the second address in response. Based on determining that the second address is not reachable by the SMF 150, the SMF 150 may generate and transmit a block request indicating that the NRF 170c should add the second address to a block list for the SMF 150 that will prevent the NRF 170c from providing the second address to the SMF 150. The SMF 150 may locally store the second address as an unreachable address and an indication of the NRF from which it received the unreachable address.

In response to receiving the block request via the block request communications 155, the NRF 170c may generate an entry in a block list indicating that the second address is to be blocked from being provided to the SMF 150 (e.g., generally or specifically in response to requests from the SMF 150 for an address for the AMF 130). The NRF 170c may also, or instead, transmit a block notification via block notification communications 156 to the AMF 130 indicating that the second address for the AMF 130 has been blocked for the SMF 150 on the NRF 170c. The AMF 130 may store this information in a block list of its own and use it in determining communications means for future communications with the SMF 150. For example, if the AMF 130 determines to initiate communications with the SMF 150 (e.g., create context communications based on receiving an address for the SMF 150 from an NRF), the AMF 130 may evaluate its own block list to determine if any of its own addresses are blocked for communications with the SMF 150. If so, the AMF 130 may select one of its unblocked addresses to initiate the communications with the SMF 150.

Continuing this example, the SMF 150, in response to determining that the second address received for the AMF 130 is unreachable, may query one or more of NRFs 170a-c of NRF pool 170 or NRFs 172a-c of NRF pool 172 for another address for the AMF 130. Because the second, unreachable address is now on a block list on NRF 170c, even if the SMF 150 queries that particular NRF again, it will not receive the unreachable address in response and instead will receive another address for the AMF 130. The SMF 150 may then attempt to provide the message transfer data to the AMF 130 using the newly obtained address for the AMF. In various examples, the SMF 150 may also generate and/or transmit an alarm or other indication to one or more users or operators of the wireless network indicating that an unreachable address has been detected. This may facilitate any remedial actions that may be needed by the network operator to remedy the problem causing the unreachability and/or to update NRFs to ensure that they have current and accurate information.

The SMF 150 may periodically check addresses for which it has stored indications that they are unreachable. For example, the SMF 150 may set a timer and/or associate a timestamp with an unreachable address when it stores an indication that the address is unreachable. After a threshold amount of time has passed and/or the expiration of the timer, the SMF 150 may transmit a test message or other type of communication to the indicated unreachable address to determine whether connectivity to the associated function or component has been restored. If the address remains unreachable, the SMF 150 may restart the time, update the associated timestamp, and/or otherwise set the unreachable address for a future test. In various examples, the SMF 150 may increase the time period between communications tests (e.g., to conserver resources). For example, the SMF may double the time period between tests (e.g., first test performed 5 seconds after address block requested, second test performed 10 second after first test, third test performed 20 seconds after second test, and so forth).

If the previously unreachable address is now reachable by the SMF 150, the SMF 150 may transmit a notification to the NRF that provided the unreachable address that the address is now reachable and/or to otherwise remove the previously unreachable address from the NRF's block list for the SMF 150. Continuing the particular example described above, the SMF 150 may determine (e.g., after testing following an expired time period) that the initially unreachable second address for the AMF 130 is now reachable. The SMF 150 may transmit an unblock request to the NRF 170c (e.g., via communications 155) that instructs the NRF 170c to remove the second address from a block list of addresses for the SMF 150. In response, the NRF 170c may remove that entry from its block list for the SMF 150 and may also, or instead, transmit an indication (e.g., via communications 156) to the AMF 130 that it may now resume using the second address for (e.g., initiating) communications with the SMF 150.

In various examples, rather than testing between time periods, the SMF 150 may be configured to remove block list entries after a period of time. For example, after the expiration of a period of time associated with a particular block list entry, the SMF 150 may transmit one or more requests to the NRF 170c to remove the associated block list entry and may also remove data stored at the SMF 150 indicating the associated blocked address. This SMF 150 may then determine if the address remains unreachable the next time the address is provided by an NRF. In situations where connectivity restoration is rapid and/or where there are many addresses available for particular functions, this may be more efficient since the address is likely to be accessible and/or removed from NRFs before it is provided again to a same SMF (or other address-requesting function).

In various examples, the SMF 150 may receive an instruction (e.g., manually generated or user generated) to clear one or more block list entries. In response, the SMF 150 may transmit one or more requests to the NRF 170c to remove block list entries and may also remove data stored at the SMF 150 indicating blocked addresses.

Similar operations may be performed for establishing a PDU session for the UE 112. For example, the gNodeB 122 may interact with the AMF 132, which may interact with the SMF 150 as described herein (e.g., in regard to the interactions between the AMF 130 and the SMF 150) to perform create context communications 152, N1N2MessageTransfer communications 158, SMF discovery communications 135, AMF discovery communications 154, block list requests and notifications, etc. A PDU sessions established for the UE 112 may be used to exchange user data 124 with the devices and/or DNs (e.g., the Internet 190) via a user plane function (UPF) 162.

As described above, an NRF pool may be configured to serve a particular geographical region or area. In examples, the NRF pool 172 may be dedicated to the area or region in which the gNodeB 122 and/or the AMF 132 are configured, while the NRF pool 170 may be dedicated to the area or region in which the gNodeB 120 and/or the AMF 130 are configured. In such examples, a function or component may access NRF pools in multiple regions. For example, the SMF 150 may access both NRF pools 170 and 172 configured in distinct geographical regions. In other examples, both NRF pools 170 and 172 are configured in the same geographical region.

Illustrative Functions and Communications

Figure 2:
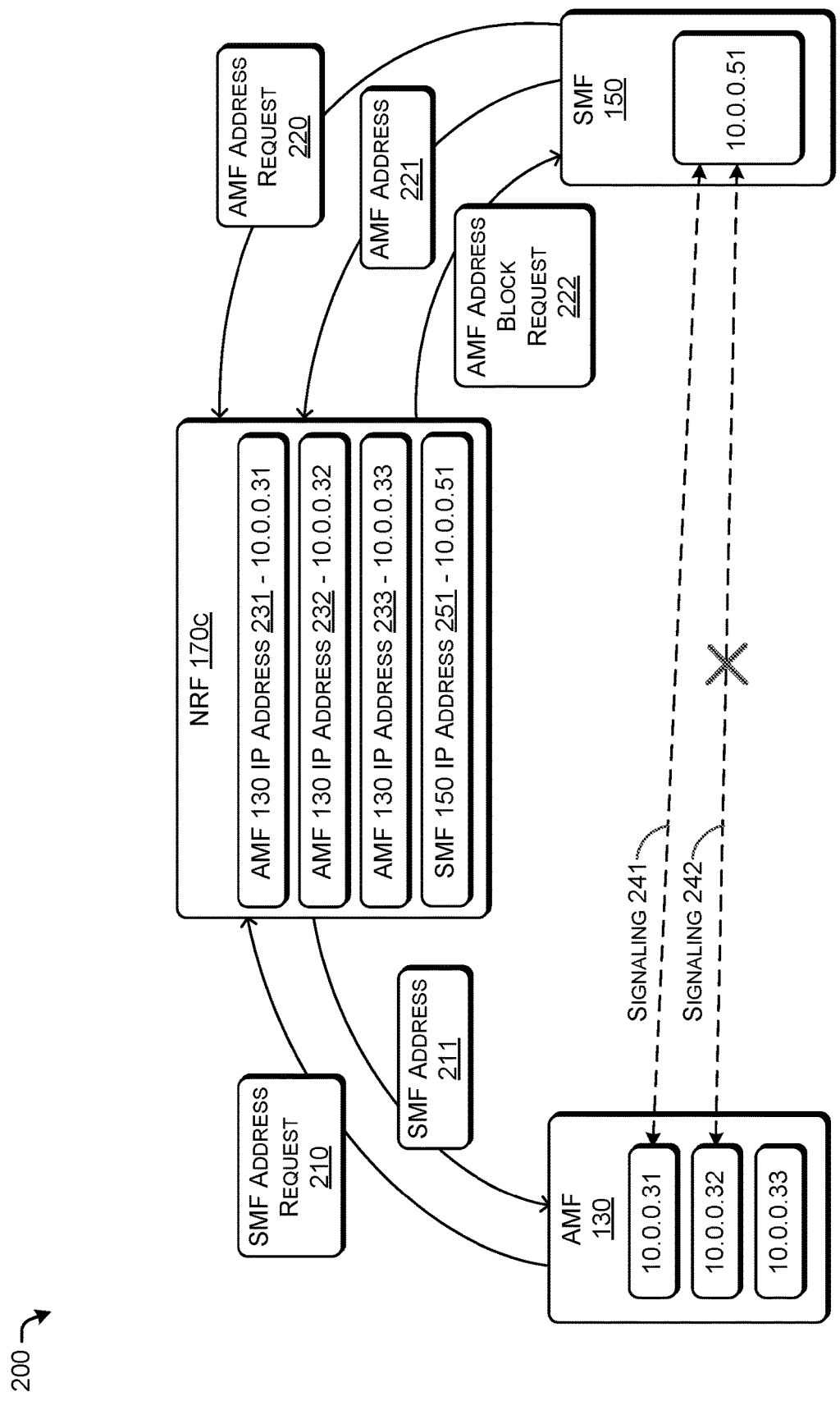
FIG. 2 is a schematic diagram of illustrative functions and communications that may be implemented in a wireless communications network in which systems and methods for repository function address blocking may be implemented, in accordance with examples of the disclosure.
Figure 3:
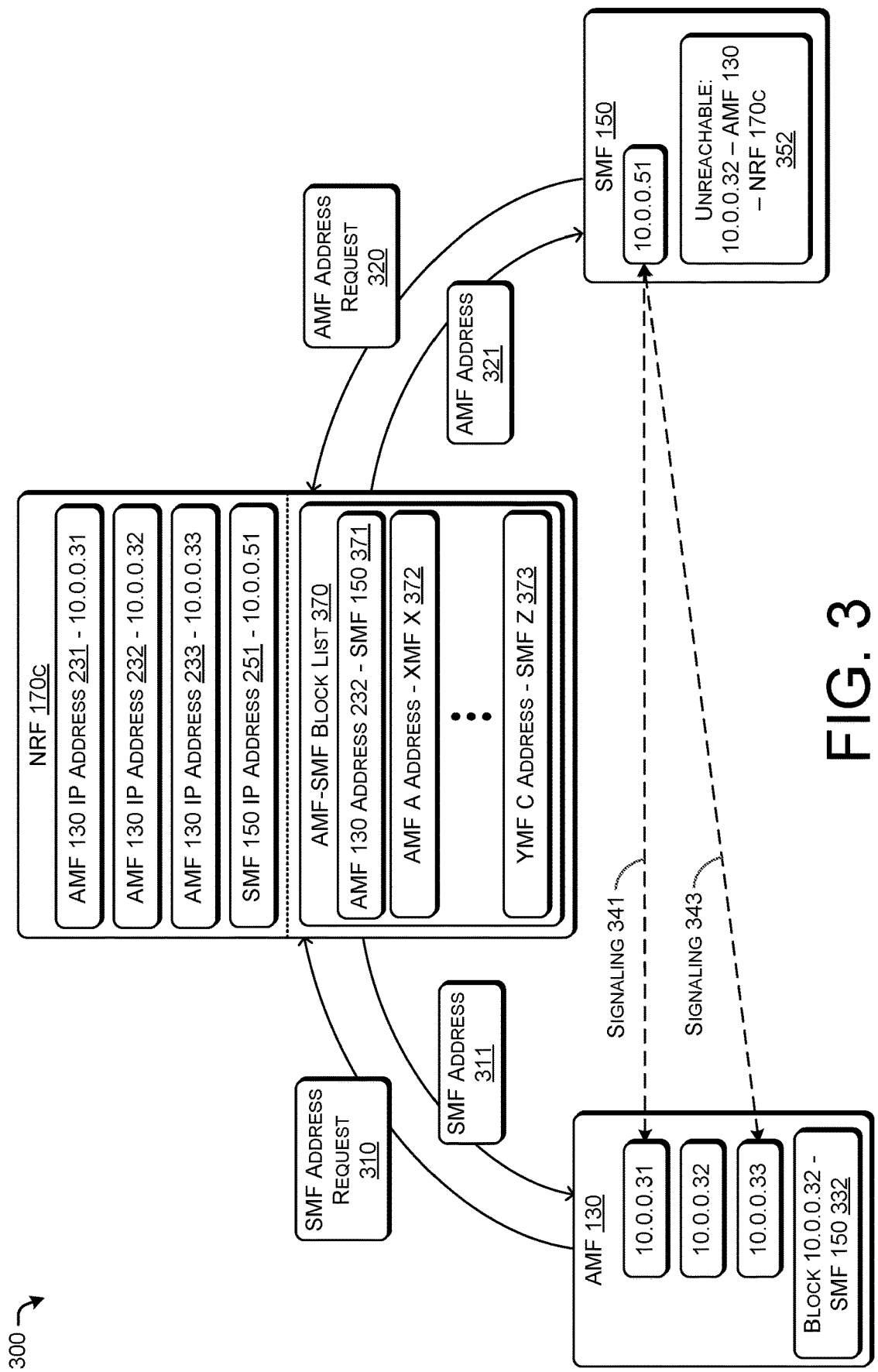
FIG. 3 is a schematic diagram of illustrative functions and communications that may be implemented in a wireless communications network in which systems and methods for repository function address blocking may be implemented, in accordance with examples of the disclosure.

FIGS. 2 and 3 illustrates schematic diagram 200 and 300 of exemplary functions and communications of various messages that may be exchanged in one or more of the disclosed systems and techniques for performing repository function address blocking as described herein. Reference may be made in this description of the exemplary functions and communications to devices, messages, function, components, and/or operations illustrated in FIG. 1 and described in regard to that figure. However, the functions and communications illustrated in FIGS. 2 and 3 and described herein may be implemented in any suitable system and/or with any one or more suitable devices and/or entities. Moreover, any of the functions and communications described in regard to FIGS. 2 and 3 may be used separately and/or in conjunction with other functions and communications and/or implemented using devices, systems, and or operations. All such embodiments are contemplated as within the scope of the instant disclosure.

The AMF 130, as shown in FIG. 2, may be configured with multiple IP addresses (e.g., 10.0.0.31, 10.0.0.32, and 10.0.0.33) while the SMF 150 may be configured with one or more IP addresses (e.g., 10.0.0.51). These addresses and identifiers for the associated functions may be stored in the NRF 170c. For example, the NRF 170c may store the AMF 130 IP addresses 231, 232, and 233 and the SMF 150 address 251 as shown in this figure.

As described herein, the AMF 130 may determine to initiate communications with the SMF 150 (e.g., to request creation of a context for a PDU session). The AMF 130 may transmit an SMF address request 210 to the NRF 170c requesting an IP address for the SMF 150. The NRF 170c may respond with an SMF address message 211 providing the SMF 150 IP address 251 to the AMF 130. The AMF 130 may then initiate communications with the SMF 150 using one of its addresses and the received address for the SMF 150. For example, the AMF 130 may initiate signaling 241 using the AMF 130 address 231 to communicate with the SMF 150 address 251.

The SMF 150 may also, or instead, determine to initiate communications with the AMF 130 (e.g., to provide message transfer data for a PDU session). The SMF 150 may transmit an AMF address request 220 to the NRF 170c requesting an IP address for the AMF 130. The NRF 170c may respond with an AMF address message 221 providing the AMF 130 IP address 232 to the SMF 150. The SMF 150 may then attempt to initiate communications with the AMF 130 using its addresses and the received AMF address. For example, the SMF 150 may attempt to initiate signaling 242 using the SMF 150 address 251 to communicate with the AMF 130 IP address 232. However, this communications may be unsuccessful (e.g., for any of the reasons set forth herein or any other reason) and signaling 242 may fail. The SMF 150 may receive an indication, or otherwise determine, that the signaling 242 has failed and/or that the AMF 130 IP address 232 is unreachable by the SMF 150.

In response to detecting that the address 232 is unreachable, the SMF 150 may generate and transmit to the NRF 170c an AMF address block request 222 requesting that the NRF 170c block or otherwise stop providing the address 232 to the SMF 150 in response to requests for an address for the AMF 130.

Referring now to FIG. 3, the NRF 170c may be configured with a block list 370 that may include entries indicating AMF-SMF pairs that may be blocked. For example, the entries in the block list 370 may indicate a particular IP address for an AMF that is blocked from being provided to a particular SMF. Such entries may also, or instead, include other information, such as particular services or functions that may be blocked, SMF (e.g., IP) addresses, timestamps, expirations dates and/or times, etc.

In this example, entry 371 of the block list may be generated by the NRF 170c in response to the AMF address block request 222. As shown in this figure, the entry 371 may indicate the AMF 130 IP address 232 and the SMF 150. Other entries may indicate other blocked addresses for other functions pairs, such as AMF A address blocked for function XMF X in entry 372 and YMF C address blocked for SMF Z in entry 372. Any combinations of functions and addresses, and pairs of any of such functions and/or addresses, are contemplated for use in a block list as described herein.

The SMF 150 may also store an indication of the blocked or unreachable AMF address, as shown in entry 352 configured at SMF 150. This entry may include an indication of the NRF at which the SMF 150 has requested the associated address be blocked so that the SMF 150 can later request that the address be unblocked should connectivity to the address be restored. As described herein, the SMF 150 may (e.g., periodically) test unreachable addresses to discover if communicative connectivity has been restored. If so, the SMF 150 may transmit a request to an NRF (e.g., NRF 170c) that the previously unreachable address be unblocked.

As described herein, in response to receiving a request to block an address for a particular SMF (or other function), an NRF may also notify the function or component associated with the address that it has been blocked. For example, the NRF 170c may notify the AMF 130 that the SMF 150 has requested that the AMF address 232 be blocked for the SMF 150 and/or that the NRF 170c has blocked that address for the SMF 150. In response, the AMF 130 may generate and/or store an indication 332 (e.g., in a block list of its own) that its address 232 is blocked for SMF 150. Based on this indication 332, the AMF 130 may determine not to use its address 232 in communications with the SMF 150, for example, in initiating a communications session with that SMF.

With these block list entries and indications in place, in this example the AMF 130 may transmit an SMF address request 310 to the NRF 170c, for example in response to receiving a PDU session request from a UE. The NRF 170c may respond with an SMF address message 311 that may indicate the SMF 150 address 251. The AMF 130 may use one or more blocked address entries to determine one of its IP addresses to use to initiate communications with the SMF 150. For example, based on receiving the address for the SMF 150, the AMF 130 may determine whether it has any blocked address entries for SMF 150. In response to detecting the entry 332 indicating that the AMF 130 address 232 is blocked for the SMF 150, the AMF 130 may select another address (e.g., other than one included on an entry associated with SMF 150) for initiating the communications. In some examples, the AMF 130 may select one of its addresses and then compare the address to those in a list of blocked addresses, selecting another if there is a match. In other examples, other techniques may be used to determine an unblocked address for use with another function, all of which are contemplated as within the scope of the instant disclosure. In this particular example, the AMF 130 may determine to use the address 231 to establish communications with the SMF 150 using signaling 341.

The SMF 150 may also, or instead, determine to initiate communications with the AMF 130 (e.g., to provide message transfer data for a PDU session). The SMF 150 may transmit an AMF address request 320 to the NRF 170c requesting an IP address for the AMF 130. The NRF 170c may determine an address to provide to the SMF 150 based on the block list 370. For example, the NRF 170c may determine an address from among multiple addresses available for the AMF 130 (e.g., using round-robin, random selection, etc.) and then compare the determined address to the block list 370. If the determined address matches an entry in the block list 37, the NRF 170c may determine another address and compare that one to the block list, and so forth, until an address is determined that does not match an entry in the block list 370. In other examples, other techniques may be used to determine an unblocked address for use with the SMF 150, all of which are contemplated as within the scope of the instant disclosure. The NRF 170c may respond with an AMF address message 321 providing the AMF 130 IP address 233 to the SMF 150. The SMF 150 may then initiate communications with the AMF 130 using its addresses and the received AMF address. For example, the SMF 150 may initiate signaling 343 using the SMF 150 address 251 to communicate with the AMF 130 IP address 233.

Illustrative Signal Flows

Figure 4:
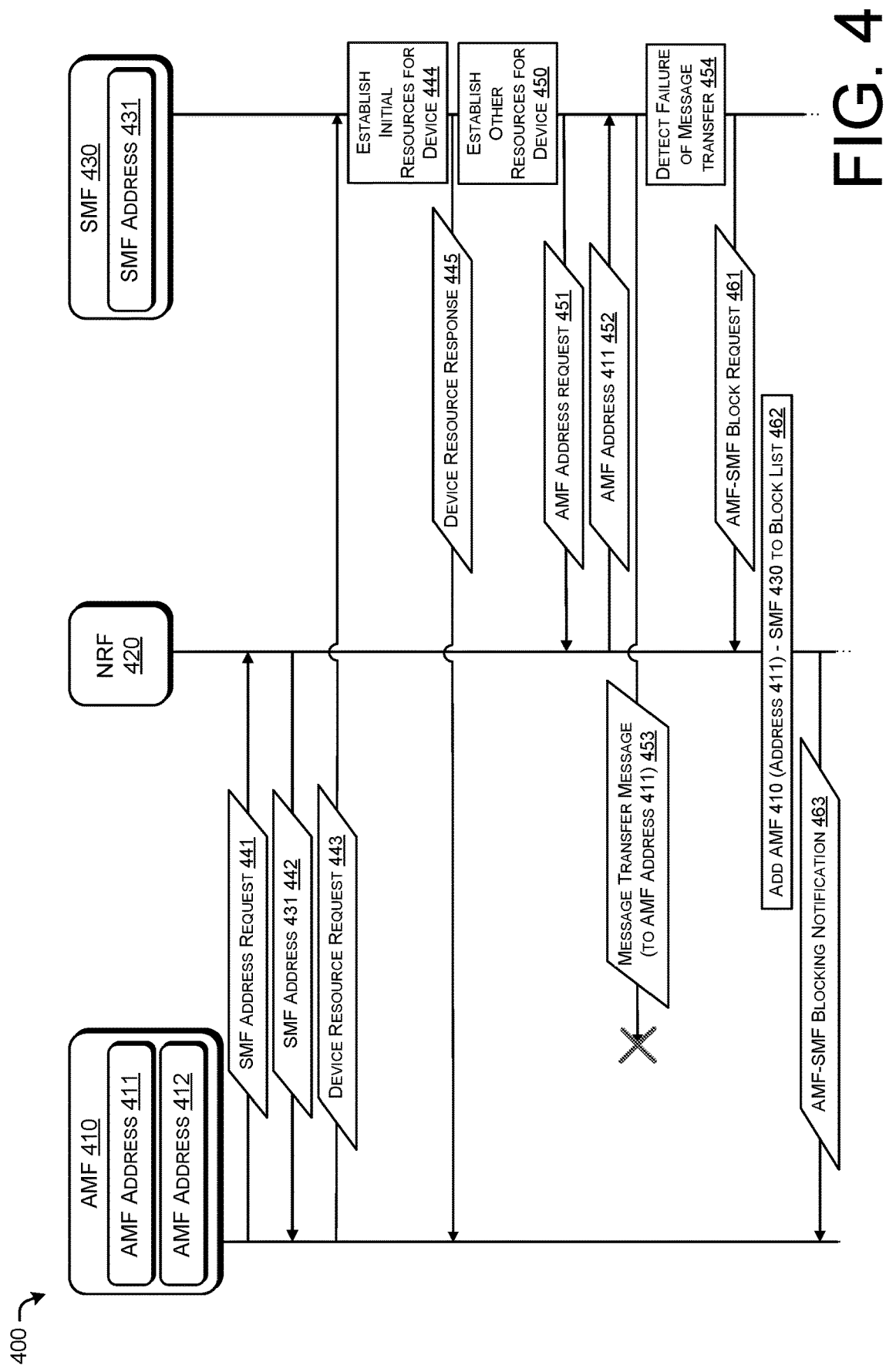
FIG. 4 is a diagram of an illustrative signal flow associated with systems and methods for repository function address blocking, in accordance with examples of the disclosure.

FIG. 4 illustrates an exemplary signal flow 400 of various messages that may be exchanged in one or more of the disclosed systems and techniques for performing repository function address blocking. Reference may be made in this description of the signal flow 400 to devices, entities, and interfaces illustrated in FIG. 1 and described in regard to that figure. However, the operations, signals, and signal flow illustrated in FIG. 4 and described herein may be implemented in any suitable system and/or with any one or more suitable devices and/or entities. Moreover, any of the operations, signals, and/or entities described in regard to FIG. 4 may be used separately and/or in conjunction with other operations, signals, and/or entities. All such embodiments are contemplated as within the scope of the instant disclosure.

An AMF 410 may be configured in a wireless communications network (in some examples, similar to AMFs 130 and 132) and may be further configured with multiple addresses, including AMF address 411 and AMF address 412. An NRF 420 may also be configured in the network (in some examples, similar to NRFs 170a-c of NRF pool 170 and NRFs 172a-c of NRF pool 172) as well as an SMF 430 (in some examples, similar to SMF 150) that may be configured with an SMF address 431.

In various examples, the AMF 410 may transmit an SMF address request 441 to the NRF 420 requesting an address for an SMF. The request 441 may include any one or more of an identifier of a specific SMF, a specific service, a specific function, etc. Alternatively, the request 441 may be more general, requesting an SMF generally or a function to provide particular service (session setup or management), etc. In response to the request 441, the NRF 420 may transmit the SMF address 431 to the AMF 410 in response 442.

Using the address 431 included in the response 442, the AMF may generate and transmit a device resource request 443 to the SMF 430 (e.g., to the address 431 of the SMF 430 using the AMF address 412). The device resource request 443 may be a request to register a device (e.g. UE), create a context for the device, establish a PDU session, etc. In response to the request 443, the SMF 430 may establish, or initiate the establishment of, the initial resources requested at operation 444. For example, the SMF 430 may create the context required for a PDU session requested with the device resource request 443. The SMF 430 may interact with one or more other functions and/or components to establish the initial resources. The SMF 430 may transmit a device resource response 445 to the AMF 410 reporting the success, failure, statue, acknowledgement, and/or any other information or data associated with the resource request 443. For example, the device resource response 445 may be a context creation response indicating that the SMF 430 has or has not successfully created a context based on the device resource request 443. Alternatively or additionally, the device resource response 445 may be an acknowledgement that the request 443 has been received.

At operation 450, the SMF 430 may further establish, or initiate the establishment of, the other (e.g. the remaining) resources required to provide the resources requested by request 443. For example, the SMF 430 may generate and/or request message transfer data such as PDU session information, associated tunnel information, QoS parameters, etc., that may be required to provide the resources requested by the device resource request 443. The SMF 430 may interact with one or more other functions and/or components to further establish and/or generate such other resources.

The SMF 430 may request an address for the AMF 410 by transmitting AMF address request 451 t the NRF 420. The SMF 430 may use this address to provide information regarding the resources requested by the request 443 to the AMF 410 so that such information can be provided to and/or used by, for example, a gNodeB and/or a UE for using the requested resources. In response to the request 451, the NRF 420 may transmit the AMF address 411 in response 452 to the SMF 430.

The SMF 430 may attempt to transmit the message transfer data determined at operation 450 in message transfer message 453 addressed to AMF address 411. However, the message 453 may not be successful for any of various reasons as described herein. The SMF 430 may detect at operation 454 that the message 453 was not successfully delivered. In response, the SMF 430 may generate and transmit a block request 461 to the NRF 420 requesting that the NRF 420 block the AMF address 411 from responses to requests from the SMF 430 for an address for the AMF 410. The SMF 430 may also, in response to the detection at operation 454 that the message 453 was not successfully delivered, store an indication that address 411 is blocked and/or was requested to be blocked (e.g., with request 461) and a timestamp or other indication to attempt to retry connecting to address 411.

Based on the request 461, at operation 462 the NRF 420 may add the AMF address 411 to a block list entry associated with the SMF 430. The NRF 420 may also, or instead, transmit a blocking notification 463 to the AMF 410 notifying the AMF 410 that its address 411 has been blockade at the NRF 420 for requests from the SMF 430. The AMF 410 may use this information to avoid initiating communications with the SMF 430 using the AMF address 411.

Figure 5:
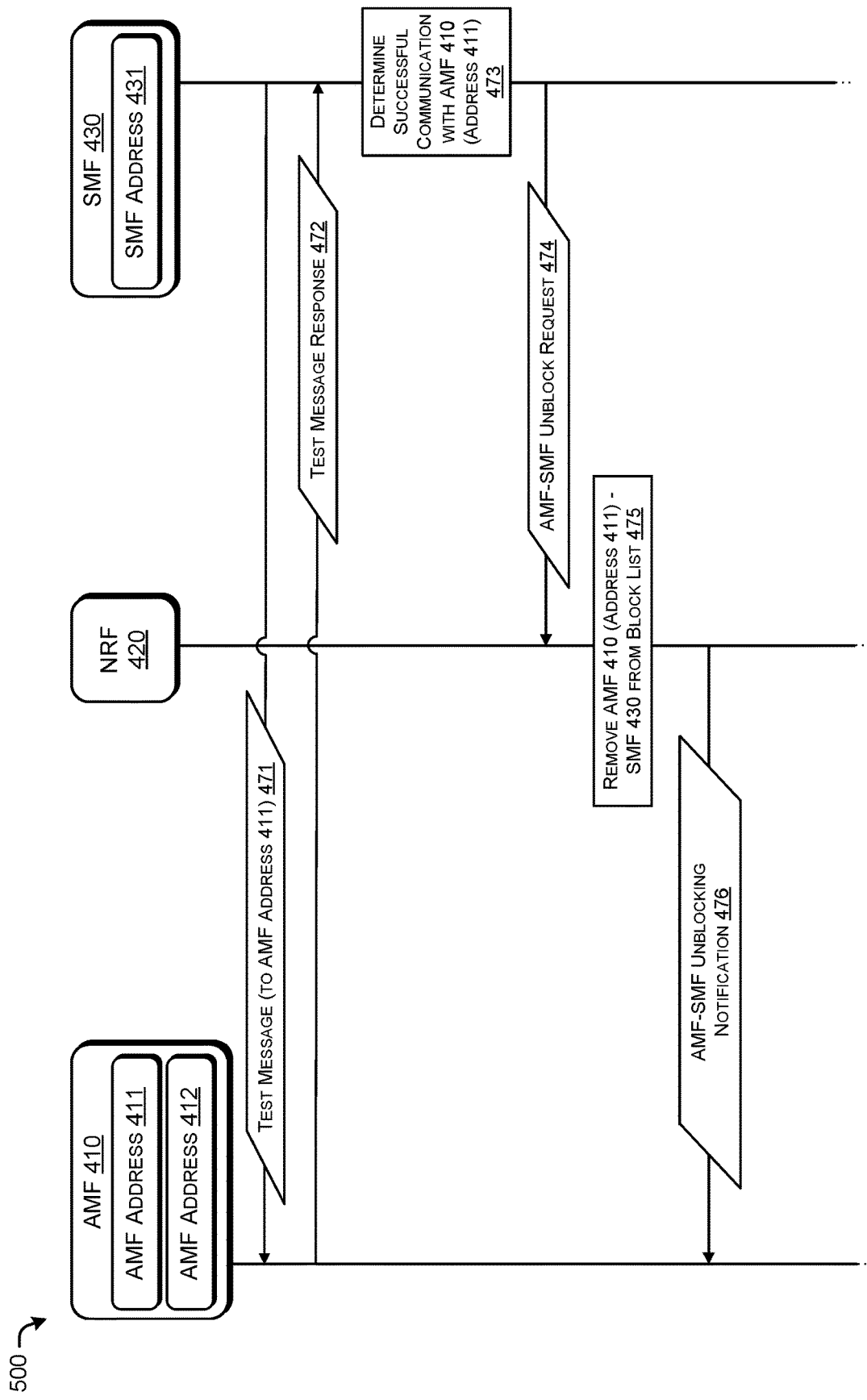
FIG. 5 is a diagram of another illustrative signal flow associated with systems and methods for repository function address blocking, in accordance with examples of the disclosure.

FIG. 5 illustrates an exemplary signal flow 500 of various messages that may be exchanged in one or more of the disclosed systems and techniques for performing repository function address blocking. Reference may be made in this description of the signal flow 500 to devices, entities, and interfaces illustrated in FIG. 1 and described in regard to that figure. However, the operations, signals, and signal flow illustrated in FIG. 5 and described herein may be implemented in any suitable system and/or with any one or more suitable devices and/or entities. Moreover, any of the operations, signals, and/or entities described in regard to FIG. 5 may be used separately and/or in conjunction with other operations, signals, and/or entities. All such embodiments are contemplated as within the scope of the instant disclosure.

Signal flow 500 represents a single flow that may be subsequent to signal flow 400 illustrated in FIG. 4. As described in regard to FIG. 4, the SMF 430 may have requested that NRF 420 block AMF address 411 in response to requests for an address for AMF 410 received at NRF 420 from SMF 430. Also as described above, the SMF 430 may have stored an indication that it has requested NRF 420 block address 411. The SMF 430 may determine to test connectivity to the AMF address 411 after this blocking operations based on one or more criteria. For example, the SMF 430 may set a timer and/or associate a timestamp with an indication that it has requested an address be blocked. In response to the expiration of a time period associated with the blocked address indication, the SMF 430 may attempt to communicate with the blocked address to determine if the address remains blocked. In this way, the SMF 430 may determine when a blocked address returns to service and resume using that address.

The SMF 430 may transmit a test message 471 to the blocked AMF address 411. The AMF 410, using the address 411, may respond to the test message 471 with test message response 472. These test messages may take any suitable form and may be dedicated test messages or any other type of message that may allow a function to determine whether if can successfully communicate with another message.

At operation 473, in response to receiving the test message response 472 from the AMF address 411 at the AMF 410, the SMF 430 may determine that communicative connectivity with the AMF 410 using the address 411 has been restored and/or that the SMF 430 may otherwise successfully communicate with the AMF 410 using the AMF address 411.

In response to the determination of operation 473, the SMF 430 may transmit an unblock request 474 to the NRF 420 requesting that the NRF 420 remove the block list entry corresponding to the AMF address 411 for the SMF 430. In response to this request, the NRF 420 may remove that entry from its block list at operation 475. The NRF 420 may also, or instead, transmit an unblocking notification 476 to the AMF 410 notifying the AMF 410 that its address 411 is no longer unreachable for the SMF 430. In response to the notification 476, the AMF 410 may determine to initiate communications with the SMF 430 using its address 411.

Illustrative Operations

Figure 6:
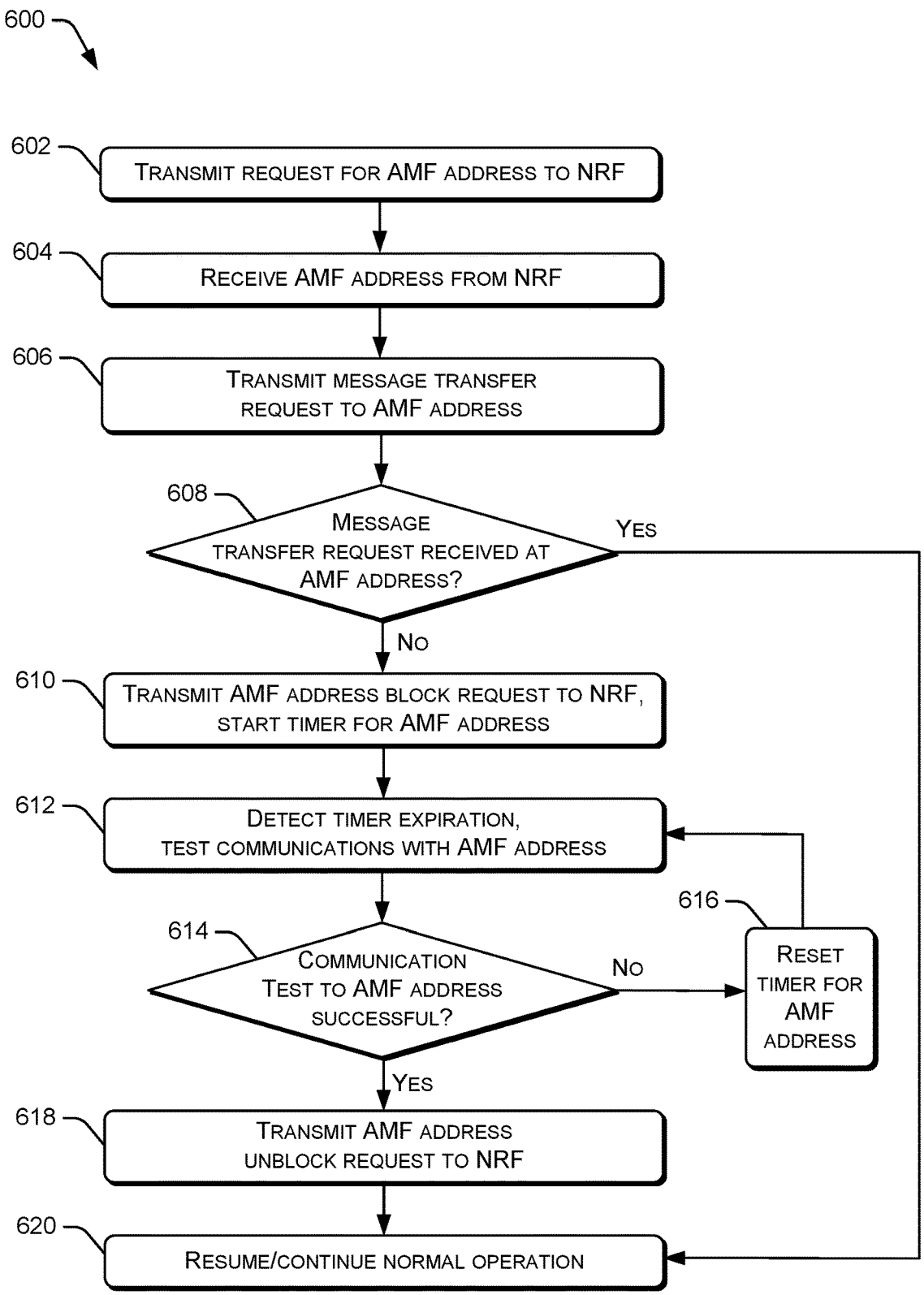
FIG. 6 is a flow diagram of an illustrative process for performing repository function address blocking, in accordance with examples of the disclosure.

FIG. 6 shows a flow diagram of an illustrative process 600 for repository function address blocking according to the disclosed embodiments. The process 600 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 600 may be described with reference to the wireless network environment 100 of FIG. 1, however other environments may also be used.

At operation 602, an SMF may transmit a request for an AMF address to an NRF. For example, and as described in more detail herein, an SMF may have message transfer data (e.g., PDU session information) to provide to an AMF to forward to a gNodeB and/or a UE. In order to obtain an address for the AMF, the SMF may transmit a request with an AMF identifier to an NRF. An identifier for the AMF may have been determined by the SMF from earlier communications, such as, but not limited to, a context request and creation process.

At operation 604, the SMF may receive a response from the NRF that includes an AMF address. The SMF may then use the received AMF address to attempt to transmit the message transfer data to the AMF. If, at operation 608, the message transfer data was successfully transmitted to the AMF using the address received at operation 604, the SMF may continue with normal operations at operation 620.

If, at operation 608, the SMF determines that the message transfer data was not successfully communicated to the AMF using the address received at operation 604, the SF may determine that the address is an unreachable address. At operation 610 the SMF may transmit a request to the NRF from which the unreachable address was received requesting that the NRF block the unreachable address from being used for responses to requests from the SMF for an address for the AMF associated with the unreachable address. The SMF may also, at this operation, store the unreachable address and the NRF from which the unreachable address was received. The SMF may also start a timer and/or associate a timestamp with the data indicating the unreachable address and the NRF from which it was received.

At operation 612, the SMF may determine that a time period for the unreachable address has expired, for example, based on the expiration of a timer associated with the stored unreachable address and/or based on a current time and a timestamp associated with the stored unreachable address. In response to determining that a time period associated with an unreachable address has expired, the SMF may further, at operation 612, transmit a test message or otherwise test communications with the unreachable address.

At operation 614, the SMF may determine whether the communications test of operation 612 was successful. If not (e.g., if the unreachable address remains unreachable), the SMF may reset the time and/or update the timestamp associated with the unreachable address at operation 616 and the process 600 may return to 612 upon expiration of the new test time period determined based on the updated timer or timestamp.

If, at operation 614, the SMF determines that the unreachable address has become reachable again (e.g., the SMF is currently able to successfully communicate with the destination function using the previously unreachable address), at operation 618 the SMF may transmit a request to the NRF associated with the previously unreachable address requesting that the NRF unblock or remove from its block list for the SMF the previously unreachable address. The SMF may also remove its own indication of the unreachable address and the NRF that originally provided the address when it was unreachable. At operation 620, the SMF may resume normal operations.

Figure 7:
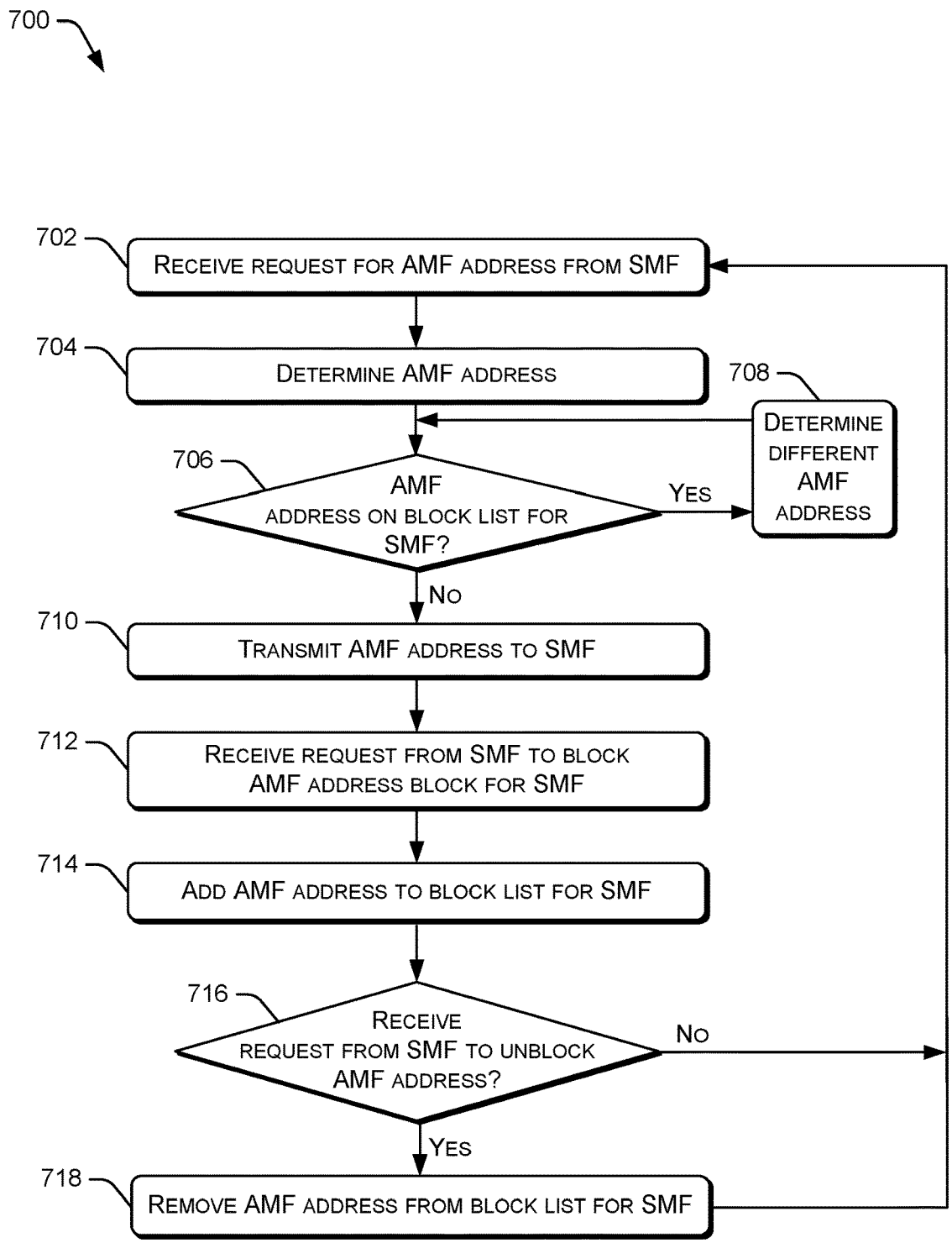
FIG. 7 is a flow diagram of another illustrative process for performing repository function address blocking, in accordance with examples of the disclosure.

FIG. 7 shows a flow diagram of an illustrative process 700 for repository function address blocking according to the disclosed embodiments. The process 700 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 700 may be described with reference to the wireless network environment 100 of FIG. 1, however other environments may also be used.

At operation 702, an NRF may receive a request for an address from a function, for example, a request for an AMF address from an SMF. The request may include an AMF identifier or indicator and/or a service or function identifier or indicator. Alternatively, such a request may include any data that may allow an NRF to determine an appropriate function for which to provide an address to a requesting function or component. The NRF may determine the address at operation 704. Various techniques of determining an address for an AMF or other function may be used, such as round-robin or random selection from multiple available addresses. In some examples, an NRF may have or determine data associated with workloads that may be associated with addresses and/or the function associated with such addresses and may select an address based on balancing workloads across such addresses and/or functions. Other means of selecting an address are contemplated as within the scope of this disclosure.

At operation 706, the NRF may determine is the determined address is on a block list associated with the requesting function. For example, the NRF may determine is the selected AMF address is blocked for the requesting SMF as described herein. If so, the NRF may determine another, different address for the AMF at operation 708. Note that in some embodiments, the NRF may evaluate the block list initially before selecting the address and remove ineligible addresses from a pool of candidate addresses prior to determining an address from the remaining candidate addresses.

It the determined address is not associated with a block list entry that is also associated with the function requesting the address, at operation 710 the NRF may transmit the determined address to the requesting function. For example, the NRF may transmit a determined AMF address to an SMF that requested an AMF address.

At operation 712, the NRF may receive a request from the requesting function to block the address that was provided at operation 710. For example, an SMF that requested an AMF address may have determined that the address provided by the NRF was not reachable by the SMF and may therefore have transmitted a request to the NRF that the provided address be blocked from being provided to that SMF.

In response to the request received at operation 712, the NRF may add the address indicated in the request to a block list associated with the sender of the request. For example, the NRF may create an entry in a block list that indicates an AMF address and an SMF that requested blocking of that address. Alternatively or additionally, the NRF may maintain a distinct list for individual functions for which it may maintain blocking information and add an entry to such a list when a particular address is to be blocked for the associated function. Further at operation 714, the NRF may transmit an indication to the function associated with the blocked address that the address is being blocked for a particular function. This may allow the function associated with the blocked address to avoid using that address in attempts to communicate with the particular function that requested the blocking.

At operation 716, the NRF may determine if a request to remove the block list entry or otherwise unblock the address has been received. If not, the process may return to operation 702 to process further requests for function addresses.

If a request to unblock an address is received at operation 716, at operation 718, the NRF may remove the entry from its block list. The NRF may also, or instead, transmit an indication to the function associated with the blocked address that the address is no longer being blocked for a particular function. This may allow the function associated with the blocked address to begin using that address again for communication with the particular function that previously requested the blocking. The NRF may then resume processing requests for function addresses at operation 702.

In summary, by more efficiently selecting function addresses and selectively avoiding those addresses that are unusable for particular functions, the disclosed systems and techniques may be able to increase the efficiency of usage of core network resources and other wireless network resources and improve the performance of both the network and user devices.

Example User Equipment

Figure 8:
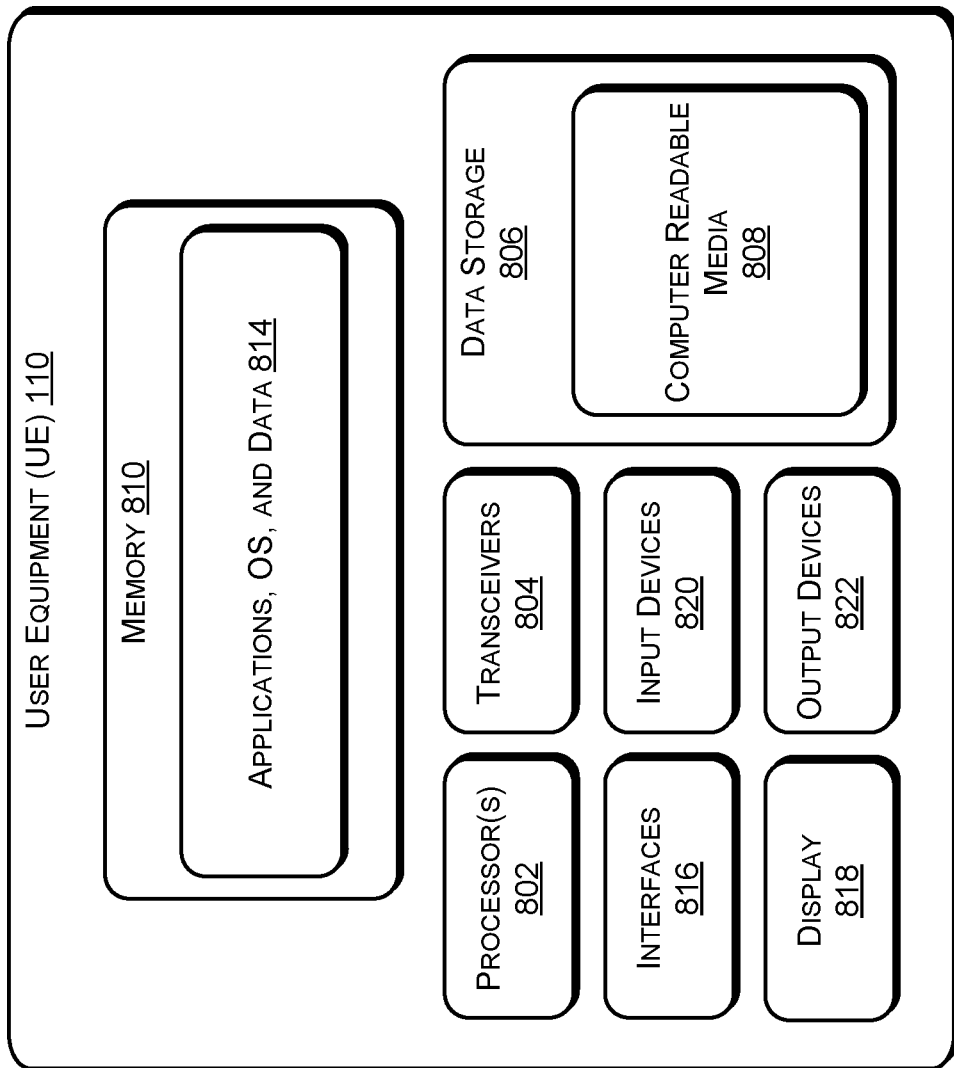
FIG. 8 is a schematic diagram of illustrative components in an example user device that is configured for interacting with a wireless communications network that implements repository function address blocking, in accordance with examples of the disclosure.

FIG. 8 is an example of a UE, such as UE 110, for use with the systems and methods disclosed herein, in accordance with some examples of the present disclosure. The UE 110 may include one or more processors 802, one or more transmit/receive antennas (e.g., transceivers or transceiver antennas) 804, and a data storage 806. The data storage 806 may include a computer readable media 808 in the form of memory and/or cache. This computer-readable media may include a non-transitory computer-readable media. The processor(s) 802 may be configured to execute instructions, which can be stored in the computer readable media 808 and/or in other computer readable media accessible to the processor(s) 802. In some configurations, the processor(s) 802 is a Central Processing Unit (CPU), a Graphics Processing Unit (GPU), or both CPU and GPU, or any other sort of processing unit. The transceiver antenna(s) 804 can exchange signals with a base station, such as gNodeB 120.

The UE 110 may be configured with a memory 810. The memory 810 may be implemented within, or separate from, the data storage 806 and/or the computer readable media 808. The memory 810 may include any available physical media accessible by a computing device to implement the instructions stored thereon. For example, the memory 810 may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which may be used to store the desired information and which may be accessed by the UE 110.

The memory 810 can store several modules, such as instructions, data stores, and so forth that are configured to execute on the processor(s) 802. In configurations, the memory 810 may also store one or more applications 814 configured to receive and/or provide voice, data and messages (e.g., SMS messages, Multi-Media Message Service (MMS) messages, Instant Messaging (IM) messages, Enhanced Message Service (EMS) messages, etc.) to and/or from another device or component (e.g., the eNodeB 120). The applications 814 may also include one or more operating systems and/or one or more third-party applications that provide additional functionality to the UE 110. The memory may also, or instead, store bandwidth information, such as UE supported bands, bandwidth(s) and bandwidth parts, as well as communications session information such as UE specific carrier bandwidth(s).

Although not all illustrated in FIG. 8, the UE 110 may also comprise various other components, e.g., a battery, a charging unit, one or more network interfaces 816, an audio interface, a display 818, a keypad or keyboard, and one or more input devices 820, and one or more output devices 822.

Example Computing Device

Figure 9:
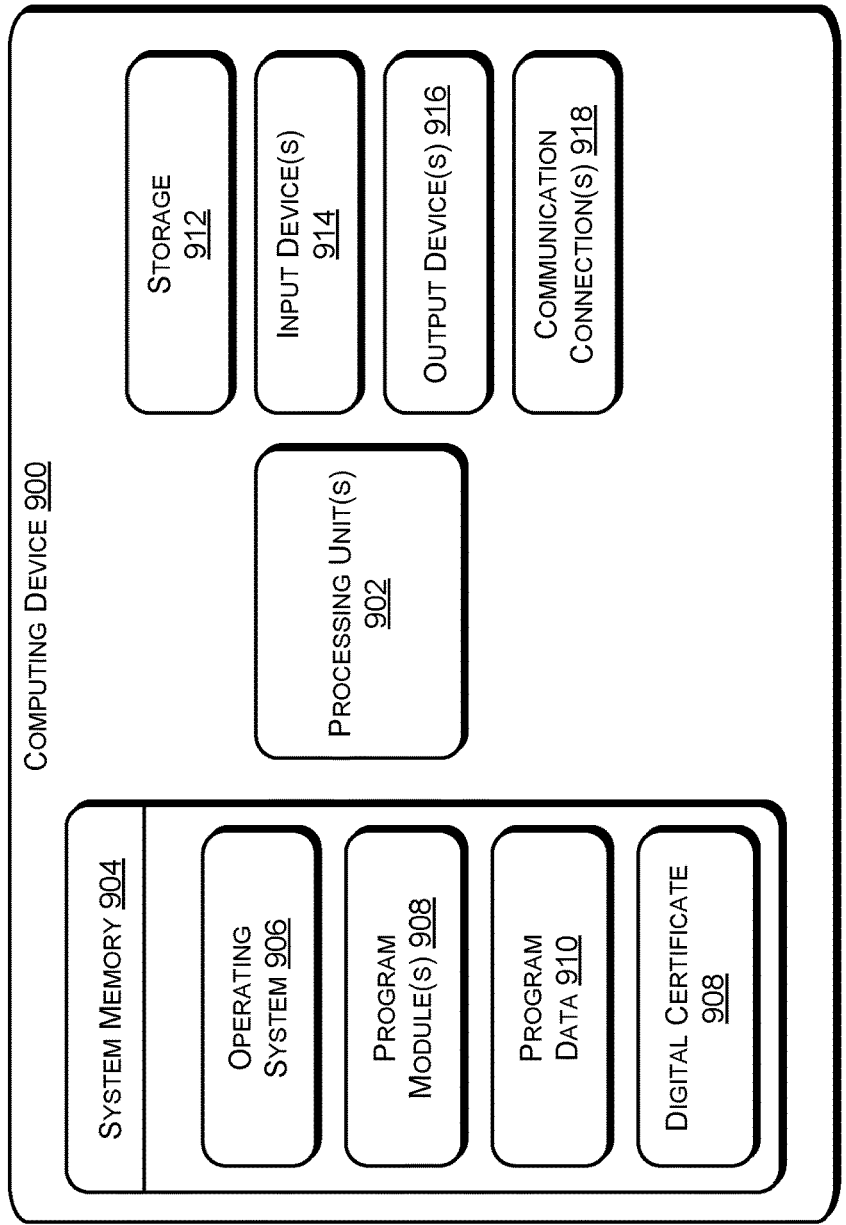
FIG. 9 is a schematic diagram of illustrative components in an example computing device that is configured for performing one or more aspects of repository function address blocking, in accordance with examples of the disclosure.

FIG. 9 is an example of a computing device 900 for use with the systems and methods disclosed herein, in accordance with some examples of the present disclosure. The computing device 900 can be used to implement various components of a core network, a base station (e.g., gNodeB 120), and/or any servers, routers, gateways, gateway elements, administrative components, etc. that can be used by a communication provider. One or more computing devices 900 can be used to implement the network 101, for example. One or more computing devices 900 can also be used to implement base stations and other components.

In various embodiments, the computing device 900 can include one or more processing units 902 and system memory 904. Depending on the exact configuration and type of computing device, the system memory 904 can be volatile (such as RAM), non-volatile (such as ROM, flash memory, etc.) or some combination of the two. The system memory 904 can include an operating system 906, one or more program modules 908, program data 910, and one or more digital certificates 920. The system memory 904 may be secure storage or at least a portion of the system memory 904 can include secure storage. The secure storage can prevent unauthorized access to data stored in the secure storage. For example, data stored in the secure storage can be encrypted or accessed via a security key and/or password.

The computing device 900 can also include additional data storage devices (removable and/or non-removable) such as, for example, magnetic disks, optical disks, or tape. Such additional storage is illustrated in FIG. 9 by storage 912.

The computing device 900 may store, in either or both of the system memory 904 and the storage 912, block list information, such as blocked addresses, associated functions, timer information and/or timestamps, message transfer data, PDU session information, etc.

Non-transitory computer storage media of the computing device 900 can include volatile and nonvolatile, removable and non-removable media implemented in any method or technology for storage of information, such as computer readable instructions, data structures, program modules, or other data. The system memory 904 and storage 912 are examples of computer readable storage media. Non-transitory computer readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 900. Any such non-transitory computer readable storage media can be part of the computing device 900.

In various embodiment, any or all of the system memory 904 and storage 912 can store programming instructions which, when executed, implement some or all of the functionality described above as being implemented by one or more systems configured in the environment 100 and/or components of the networks 101 and 102.

The computing device 900 can also have one or more input devices 914 such as a keyboard, a mouse, a touch-sensitive display, voice input device, etc. The computing device 900 can also have one or more output devices 916 such as a display, speakers, a printer, etc. can also be included. The computing device 900 can also contain one or more communication connections 918 that allow the device to communicate with other computing devices using wired and/or wireless communications.

Example Clauses

The following paragraphs describe various examples. Any of the examples in this section may be used with any other of the examples in this section and/or any of the other examples or embodiments described herein.

- A: A method performed by a one or more computing devices configured in a wireless communications network, the method comprising: receiving, at a repository function from a session management function, a first request for a first address for an access management function; determining, at the repository function, the first address from among a plurality of addresses associated with the access management function; transmitting, from the repository function to the session management function, the first address; receiving, at the repository function from the session management function, a request to block the first address from responses to requests for addresses for the access management function; storing and associating, in a memory at the repository function, an indication of the first address and an indication of the session management function; receiving, at the repository function from the session management function, a second request for a second address for the access management function; determining, at the repository function, the second address from among the plurality of addresses associated with the access management function; determining, at the repository function, that the second address does not correspond to the indication of the first address; and transmitting, from the repository function to the session management function based at least in part on determining that the second address does not correspond to the indication of the first address, the second address.
- B: The method of paragraph A, further comprising: receiving, at the repository function from the session management function, a third request for a third address for the access management function; determining, at the repository function, the third address from among the plurality of addresses associated with the access management function; determining, at the repository function, that the third address corresponds to the indication of the first address; determining, at the repository function and based at least in part on determining that the third address corresponds to the indication of the first address, a fourth address from among the plurality of addresses associated with the access management function; determining, at the repository function, that the fourth address does not correspond to the indication of the first address; and transmitting the fourth address from the repository function to the session management function based at least in part on determining that the fourth address does not correspond to the indication of the first address.
- C: The method of paragraph A or B, further comprising transmitting, from the repository function to the access management function, the indication of the first address, the indication of the session management function, and an indication of the request to block the first address.
- D: The method of paragraph C, wherein the indication of the request to block the first address causes the access management function to block initiation of communications from the access management function to the session management function using the first address.
- E: The method of any of paragraphs A-D, The method of claim 1, further comprising: receiving, at the repository function from the session management function, a request to unblock the first address; and removing, from the memory at the repository function, the indication of the first address and the indication of the session management function.
- F: The method of paragraph E, further comprising transmitting, from the repository function to the access management function, an indication of the request to unblock the first address.
- G: A network computing device configured at a wireless communications network, the network computing device comprising: one or more processors; one or more transceivers; and non-transitory computer-readable media storing computer-executable instructions that, when executed by the one or more processors, cause the one or more processors to perform operations comprising: transmitting a first request for a first address for an access management function to a repository function; receiving the first address from the repository function; determining that communications transmitted to the first address were not received by the access management function; based at least in part on determining that the communications transmitted to the first address were not received by the access management function, transmitting a request to block the first address from responses to requests for addresses for the access management function; storing and associating an indication of the first address, an indication of the repository function, and a timestamp; transmitting a second request for a second address for the access management function to the repository function; receiving the second address from the repository function, wherein the second address is distinct from the first address; and transmitting data to the access management function using the second address.
- H: The network computing device of paragraph G, wherein the operations further comprise: determining that a time period has expired based at least in part on the timestamp; and based at least in part on determining that the time period has expired, transmitting a communication to the first address.
- I: The network computing device of paragraph H, wherein the operations further comprise: receiving a response from the access management function using the first address; and based at least in part on receiving the response, transmitting a request to unblock the first address to the repository function.

J: The network computing device of paragraph I, wherein the operations further comprise: determining that no response has been received from the access management function using the first address; and based at least in part on determining that no response has been received from the access management function using the first address, storing and associating an updated timestamp with the indication of the first address and the indication of the repository function.

K: The network computing device of paragraph J, wherein the operations further comprise: storing and associating the time period with the timestamp, the indication of the first address, and the indication of the repository function; and based at least in part on determining that no response has been received from the access management function using the first address, storing and associating an updated time period with the updated timestamp, the indication of the first address, and the indication of the repository function.

L: The network computing device of paragraph K, wherein the updated time period is greater than the time period.

M: The network computing device of any of paragraphs G-L, wherein the first address is an incomplete address, an improperly formatted address, or an empty address.

N: The network computing device of any of paragraphs G-M, wherein the data comprises 5G message transfer data.

O: A non-transitory computer-readable media storing computer-executable instructions that, when executed by one or more processors, cause the one or more processors to perform operations comprising: transmitting a first request for an address for an access management function to a repository function; receiving the address from the repository function; determining that communications transmitted to the address were not received by the access management function; based at least in part on determining that the communications transmitted to the address were not received by the access management function, transmitting, to the repository function, a request to block the address from responses to requests for addresses for the access management function; storing and associating an indication of the address, an indication of the repository function, a time period, and a timestamp; determining, based at least in part on the timestamp, that the time period has expired; and based at least in part on determining that the time period has expired: transmitting a request to unblock the address to the repository function; and deleting the indication of the address, the indication of the repository function, the time period, and the timestamp.

P: The non-transitory computer-readable media of paragraph O, wherein: the operations based at least in part on determining that the time period has expired further comprise determining that second communications transmitted to the address were successfully received by the access management function; and transmitting the request to unblock the address is further based at least in part on determining that the second communications transmitted to the address were successfully received by the access management function.

Q: The non-transitory computer-readable media of any of paragraphs O or P, wherein transmitting the request to block the address to the repository function causes the repository function to transmit an indication of the request to block the address to the access management function to block initiation of second communications from the access management function using the address.

R: The non-transitory computer-readable media of any of paragraphs O-Q, wherein transmitting the request to unblock the address to the repository function causes the repository function to transmit an indication of the request to unblock the address to the access management function to allow initiation of second communications from the access management function using the address.

S: The non-transitory computer-readable media of any of paragraphs O-R, wherein the operations further comprise transmitting 5G message transfer data to the access management function.

T: The non-transitory computer-readable media of any of paragraphs O-S, wherein the operations further comprise transmitting 5G context creations data to the access management function.

While the example clauses described above are described with respect to one particular implementation, it should be understood that, in the context of this document, the content of the example clauses can also be implemented via a method, device, system, computer-readable medium, and/or another implementation. Additionally, any of the examples A-T can be implemented alone or in combination with any other one or more of the examples A-T.

CONCLUSION

Depending on the embodiment, certain operations, acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, components, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and components described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method performed by a one or more computing devices configured in a wireless communications network, the method comprising:
   receiving, at a repository function from a session management function, a first request for a first address for an access management function;
   determining, at the repository function, the first address from among a plurality of addresses associated with the access management function;
   transmitting, from the repository function to the session management function, the first address;
   receiving, at the repository function from the session management function, a request to block the first address from responses to requests for addresses for the access management function;
   storing and associating, in a memory at the repository function, an indication of the first address and an indication of the session management function;
   receiving, at the repository function from the session management function, a second request for a second address for the access management function;
   determining, at the repository function, the second address from among the plurality of addresses associated with the access management function;
   determining, at the repository function, that the second address does not correspond to the indication of the first address; and
   transmitting, from the repository function to the session management function based at least in part on determining that the second address does not correspond to the indication of the first address, the second address.

2. The method of claim 1, further comprising:
   receiving, at the repository function from the session management function, a third request for a third address for the access management function;
   determining, at the repository function, the third address from among the plurality of addresses associated with the access management function;
   determining, at the repository function, that the third address corresponds to the indication of the first address;
   determining, at the repository function and based at least in part on determining that the third address corresponds to the indication of the first address, a fourth address from among the plurality of addresses associated with the access management function;
   determining, at the repository function, that the fourth address does not correspond to the indication of the first address; and
   transmitting the fourth address from the repository function to the session management function based at least in part on determining that the fourth address does not correspond to the indication of the first address.

3. The method of claim 1, further comprising transmitting, from the repository function to the access management function, the indication of the first address, the indication of the session management function, and an indication of the request to block the first address.

4. The method of claim 3, wherein the indication of the request to block the first address causes the access management function to block initiation of communications from the access management function to the session management function using the first address.

5. The method of claim 1, further comprising:
receiving, at the repository function from the session management function, a request to unblock the first address; and
removing, from the memory at the repository function, the indication of the first address and the indication of the session management function.

6. The method of claim 5, further comprising transmitting, from the repository function to the access management function, an indication of the request to unblock the first address.

7. A network computing device configured at a wireless communications network, the network computing device comprising:
one or more processors;
one or more transceivers; and
non-transitory computer-readable media storing computer-executable instructions that, when executed by the one or more processors, cause the one or more processors to perform operations comprising:
transmitting a first request for a first address for an access management function to a repository function;
receiving the first address from the repository function;
determining that communications transmitted to the first address were not received by the access management function;
based at least in part on determining that the communications transmitted to the first address were not received by the access management function, transmitting a request to block the first address from responses to requests for addresses for the access management function;
storing and associating an indication of the first address, an indication of the repository function, and a timestamp;
transmitting a second request for a second address for the access management function to the repository function;
receiving the second address from the repository function, wherein the second address is distinct from the first address; and
transmitting data to the access management function using the second address.

8. The network computing device of claim 7, wherein the operations further comprise:
determining that a time period has expired based at least in part on the timestamp; and
based at least in part on determining that the time period has expired, transmitting a communication to the first address.

9. The network computing device of claim 8, wherein the operations further comprise:
receiving a response from the access management function using the first address; and
based at least in part on receiving the response, transmitting a request to unblock the first address to the repository function.

10. The network computing device of claim 8, wherein the operations further comprise:

determining that no response has been received from the access management function using the first address; and
based at least in part on determining that no response has been received from the access management function using the first address, storing and associating an updated timestamp with the indication of the first address and the indication of the repository function.

11. The network computing device of claim 10, wherein the operations further comprise:
storing and associating the time period with the timestamp, the indication of the first address, and the indication of the repository function; and
based at least in part on determining that no response has been received from the access management function using the first address, storing and associating an updated time period with the updated timestamp, the indication of the first address, and the indication of the repository function.

12. The network computing device of claim 11, wherein the updated time period is greater than the time period.

13. The network computing device of claim 7, wherein the first address is an incomplete address, an improperly formatted address, or an empty address.

14. The network computing device of claim 7, wherein the data comprises 5G message transfer data.

15. A non-transitory computer-readable media storing computer-executable instructions that, when executed by one or more processors, cause the one or more processors to perform operations comprising:
transmitting a first request for an address for an access management function to a repository function;
receiving the address from the repository function;
determining that communications transmitted to the address were not received by the access management function;
based at least in part on determining that the communications transmitted to the address were not received by the access management function, transmitting, to the repository function, a request to block the address from responses to requests for addresses for the access management function;
storing and associating an indication of the address, an indication of the repository function, a time period, and a timestamp;
determining, based at least in part on the timestamp, that the time period has expired; and
based at least in part on determining that the time period has expired:
transmitting a request to unblock the address to the repository function; and
deleting the indication of the address, the indication of the repository function, the time period, and the timestamp.

16. The non-transitory computer-readable media of claim 15, wherein:
the operations based at least in part on determining that the time period has expired further comprise determining that second communications transmitted to the address were successfully received by the access management function; and
transmitting the request to unblock the address is further based at least in part on determining that the second communications transmitted to the address were successfully received by the access management function.

17. The non-transitory computer-readable media of claim 15, wherein transmitting the request to block the address to the repository function causes the repository function to transmit an indication of the request to block the address to the access management function to block initiation of second communications from the access management function using the address.

18. The non-transitory computer-readable media of claim 15, wherein transmitting the request to unblock the address to the repository function causes the repository function to transmit an indication of the request to unblock the address to the access management function to allow initiation of second communications from the access management function using the address.

19. The non-transitory computer-readable media of claim 15, wherein the operations further comprise transmitting 5G message transfer data to the access management function.

20. The non-transitory computer-readable media of claim 15, wherein the operations further comprise transmitting 5G context creations data to the access management function.

* * * * *